June 24, 1930. J. DE KORWIN-SOKOLOWSKI 1,766,330
FLYING MACHINE
Filed Feb. 20, 1929 3 Sheets-Sheet 3
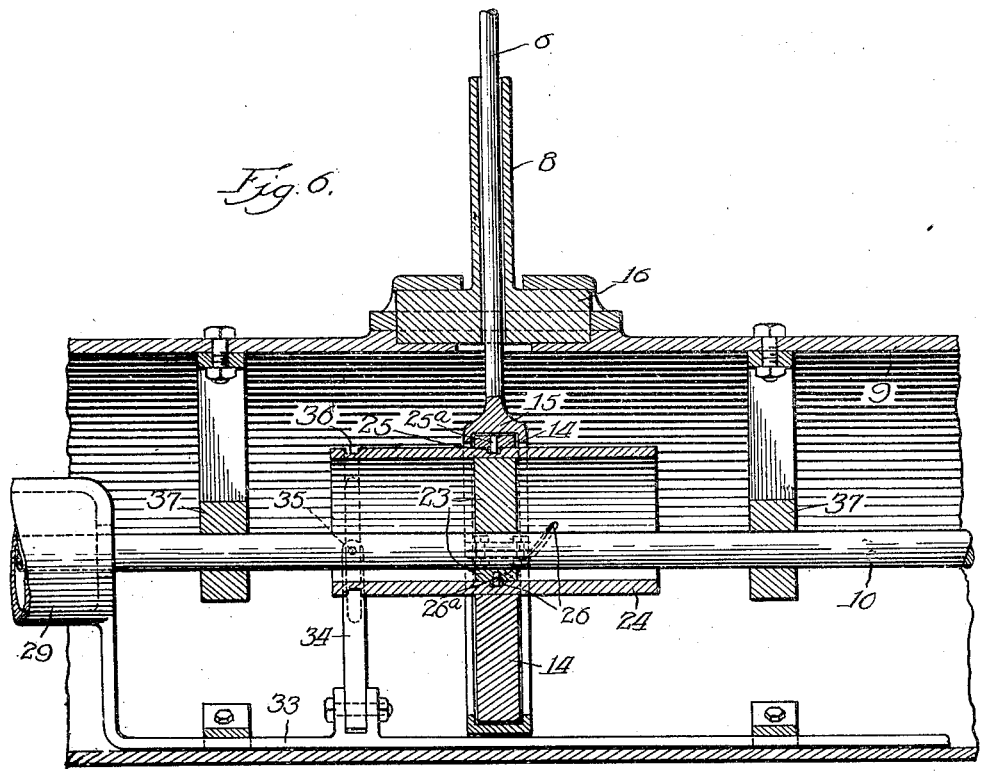
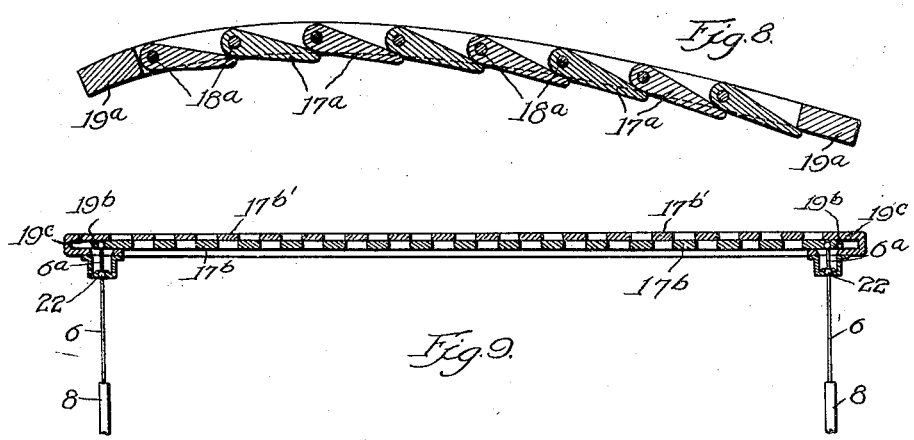
Inventor:
Joseph De Korwin Sokolowski
By: Wilkinson, Huxley, Byron, & Knight
Attys.
Witness
A. B. Davison Patented June 24, 1930

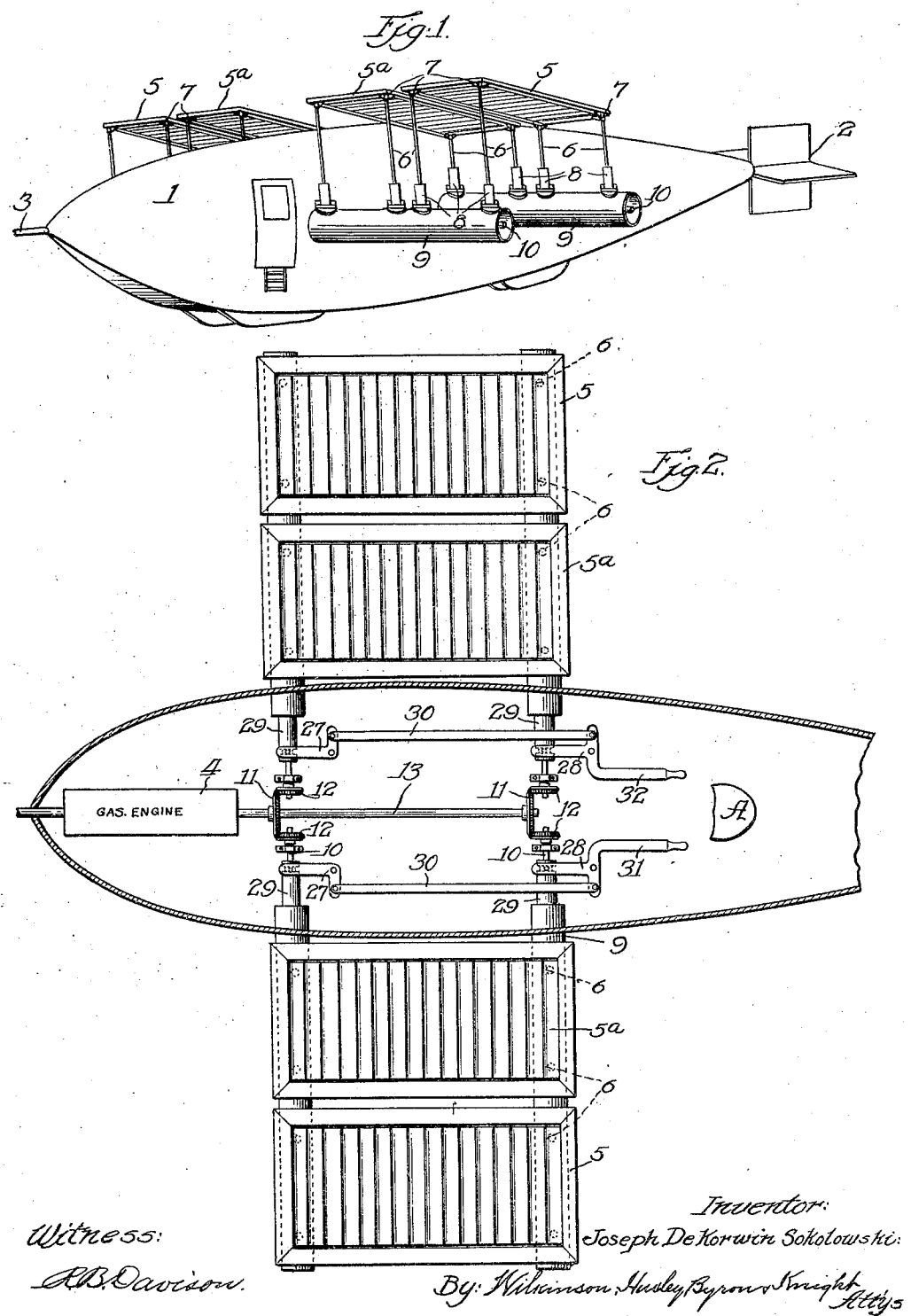

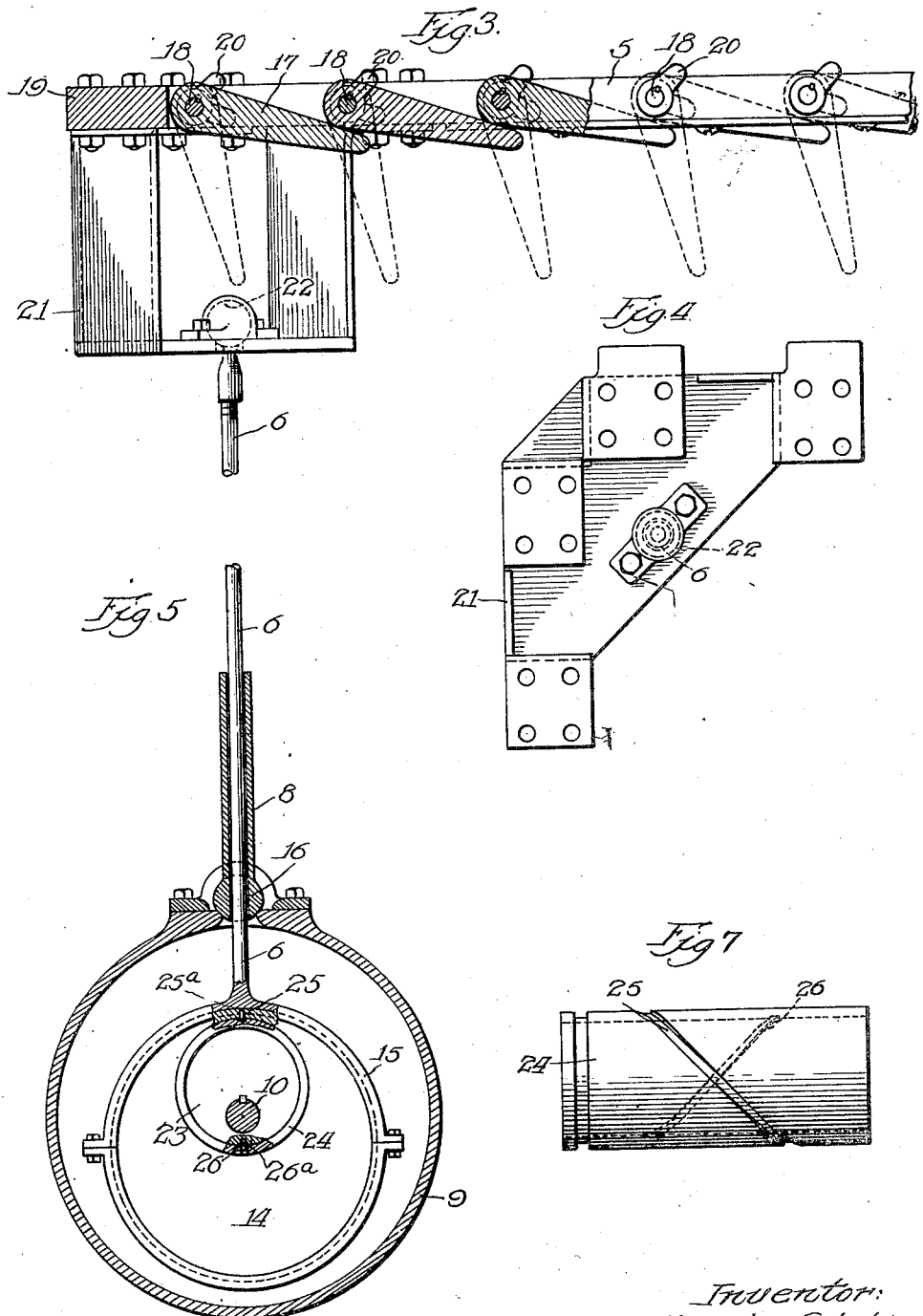

1,766,330

UNITED STATES PATENT OFFICE

JOSEPH DE KORWIN-SOKOLOWSKI, OF BRUSSELS, BELGIUM

FLYING MACHINE

Application filed February 20, 1929. Serial No. 341,339.

This invention relates to flying machines operating upon the principle of imitated bird flight, in that it depends for its sustaining forces primarily upon movement of its wings as distinguished from the principle of the helicopter or that of the gliding wing or aeroplane type of flying machine, although the invention does lend itself advantageously to embodiment in a machine which also involves the principle of gliding flight if desired.

The identifying principle of the present invention has nothing to do with the aeroplane or the different types of helicopter; it is rather a species of imitated bird flight. The bird, in order to rise, flaps its wings quickly downward. When the wings have reached the lower limit, a vacuum exists over them, and an air pressure has built up beneath them which, though momentary, is sufficient to bring the bird abruptly upward. This is, of course, immediately followed by air rushing into the air void over the wing, but the bird, in order to retain the climbing tendency, avoids the air resistance thus interposed, by spreading its feathers or inclining its wings toward the vertical, returns its wings upward, and then repeats the pressure developing downward stroke. This operation of nature, because of the construction of the bird's wing, is uneconomical in that in the downward stroke of the wing only the end of the wing functions one hundred percent, the middle working fifty percent, and the shoulder imparting nothing at all, whereas a lifting plane constructed according to the present invention works throughout its area with full and equally distributed forces.

The theory of the present invention may be broadly explained as follows: If one permits a surface or plane, while remaining parallel with its normal position, to strike downwardly with great velocity so that after, for instance, a fall of 10 c. m. it has attained a speed of descent of ten meter seconds, there exists over the surface, for the moment, a temporary vacuum, and an air pressure of 1 kg. per square c. m. acts against the lifting surface and exerts an almost violent lift. But scarcely is the tendency to upward movement imparted before the air rushes into the empty space above the surface, and continued upward thrust is interrupted.

However, the effective surface of the plane of the present invention is divided into a series of slats or shutters distributed throughout the entire plane, which slats or shutters are closed on the downward stroke and opened on the upward stroke, for instance, by positively acting mechanical means, or by having the slats or shutters so arranged that as soon as the superimposed air resistance becomes greater than the pressure from beneath, they open automatically so that excessive air resistance will not stand in the way of upward movement, and before the previously developed lifting force is completely dissipated there follows the next downward stroke effected by the motor; and since at the moment of the setting in of this downward movement the slats or shutters are again closed and the lifting plane strikes as a completely closed surface, lifting or supporting force will be renewed. A repetition of the vacuum above the plane, the full air pressure from below, the resultant upward movement, etc. may thus be repeated, to the end of causing climbing, hovering, or controlled descent of the plane by merely regulating the power that is used in operating the wings. That is to say, instead of a deliberate sequence of strokes there will be in practice a rapid vibration of the lifting surface which causes climbing, or a slower vibration which results in standing still, or a further restriction of vibration which results in controlled descent.

The correctness of the above-narrated theory has been fully established by applicant by experiments which were numerous and which were made with experimental machines employing differently formed lifting surfaces and different driving means. Notwithstanding such experiments were carried out with primitive apparatus, there was attained, with a plane scarcely 2 square c. m's. in area and with a downward stroke involving a 20 c. m. movement of only 5 meter seconds of velocity, an upward moment capable of sustaining a weight of 200 kg. Theoretically, a lifting plane with 10 c. m.

downward movement at a speed of 10 meter seconds should attain, for every square meter of its superficial area, a lift of 10,000 kgs.

Accordingly, the underlying principle of the present invention involves the use of lifting planes or wings having a movement which includes a vertical component of such amplitude and velocity as will produce upon the upper surface of the wing a vacuum, and beneath the wing an air pressure of atmosphere or a pressure in excess of atmosphere resulting from compression under the downward strokes of the planes or wings sufficient to lift the plane together with the load which it carries; these planes or wings having their surfaces built up of slats, shutters or equivalent component parts, receiving movements of such nature that they will become spaced apart or opened during the upward movement of the planes or wings, and thereby eliminate objectionable air resistance during the upward movements of the planes or wings, but will close together so as to present a continuous unbroken surface developing complete air resistance during the downward stroke; the preferred embodiment of the invention involving the further principle of having the slats or shutters so designed that when open they will develop or assist in developing necessary propulsive forces, as, for instance, by having them assume angles of incidence to the impinging air during their upward movements, which will produce a resultant forward reaction on the wings, or by having the slats or shutters in their open position and during the rearward component or combined rearward and upward components of their movement present a sufficient resistance to air to produce the aforesaid forwardly propelling force; also to provide means whereby the amplitude or velocity, or both amplitude and velocity, of wing movement may be varied at will, so that the resultant lifting force will be sufficient to cause the machine to climb or to hover at a fixed level, or settle downward at a controlled rate of descent, at the will of the operator.

In carrying out the invention, the shutters can be of any shape, form, or design, so long as they close on the downward movement and open on the upward movement, and this opening and closing can be by either automatic or positively acting mechanical shifting means, which shifting movements may be so regulated as to produce a desired degree of diminution of air pressure or vacuum on one surface of the plane and compressed atmospheric pressure on the other side thereof for regulating climbing, sustention, or descent, and also for varying the relative pressures between the front and rear aspects of the slats or shutters at suitable times in their cycles of movement for the purpose of developing, regulating, or arresting forces in the direction of propulsion.

In order that the invention may be fully understood, one illustrative embodiment of the same, together with illustrative modifications of some of its operative elements, will now be described with reference to the accompanying drawings. In said drawings—

Figure 1 is a perspective view of a flying machine equipped with sustaining and controlling wings in accordance with the present invention.

Figure 2 is a plan view of the same, on an enlarged scale, with the fuselage in horizontal section to disclose power and control elements within.

Figure 3 is a detail view, in vertical foreand-aft section, of a portion of one of the wings, illustrating one method of developing opening and closing slats, as well as one form of articulation between the wing and the means through which it is moved.

Figure 4 is a detail view of the attaching bracket used in the wing construction shown in Figure 3.

Figure 5 is a detail view of the means for developing an oscillatory movement and imparting the same to the wing, together with means for varying the amplitude of such movement.

Figure 6 is a detail view of parts shown in Figure 5, as viewed in section in a plane perpendicular to the plane of Figure 5.

Figure 7 is a detail view of a sleeve interposed between the two cams which develop the oscillatory movement of the wing for the purpose of varying the amplitude of such movement.

Figure 8 is a sectional detail view suggesting a modified form of wing useful in gliding manipulation of the machine, or in augmenting sustaining force, on the gliding plane principle, simultaneously with the development of sustaining force by the underlying principle of the present invention; and Figure 9 is a detail view showing a modified means for alternately opening and closing the wing surface.

Referring to Figures 1 and 2, 1 represents a fuselage which may be of any approved design, and which may have any of the adjuncts of an ordinary aeroplane that are not incompatible with the present invention, such, for instance, as combined elevating and steering elements 2, and if desired (although it will not be indispensable) a forward shaft 3 on which may be mounted a conventional propeller (not shown), but which may project forward from any suitable standard form of engine 4.

According to the present invention, the flying machine is to be sustained wholly or principally by means of planes 5, $5^a$ on either side of the machine, which planes will have a positively and mechanically imparted movement relatively to the fuselage 1, which movement is largely made up of vertical components for the purpose of developing a lifting effect on the downward movements of the planes; and these planes, in order to largely neutralize shock upon the machine, due to reversal of their movements, will preferably be subdivided into sections, for instance, by providing a pair of sections 5ª in addition to the sections 5, and causing the several pairs of sections (of which there may be any number) to alternate in their strokes or movements, so that one or more pairs are moving upward while a corresponding number of pairs are moving downward.

In order to impart movement to the wings 5, 5ª, each wing is sustained by a suitable number of thrust rods 6, suitably articulated to the wings at 7, and extending downwardly through guiding sleeves 8 into shaft housings 9 that extend from the sides of the fuselage.

As shown in Figure 2, shaft housings 9 contain shafts 10 which are rotated by gear wheels 11 meshing with pinions 12 on the shafts, said gear wheels being carried upon power shaft 13 of the engine 4.

As shown in Figures 5 and 6, each shaft 10 is provided with a cam 14 which acts through the strap 15 upon the thrust rod 6 and by rotation of the shaft 10, and through said cam and shaft imparts a movement to the thrust rod 6 which has both vertical and fore-and-aft components and imparts to the plane 5 or 5ª a corresponding oscillatory movement; the guide sleeve 8 through which the thrust rod 6 passes being trunnioned in some suitable way, as suggested at 16 in Figures 5 and 6, to permit the thrust rod 6 to oscillate while sliding vertically.

As shown in Figure 3, the wings are so constructed that they present a solid front with maximum resistance to the air during their downward stroke, and an open or interrupted surface of minimum resistance during their upward stroke, the particular means employed to this end in the embodiment here selected for illustration, consisting of slats 17 pivoted at 18 on the frame 19 and adapted to move from their position shown in full lines, which they occupy during the downward stroke, to the positions shown in dotted lines, which they assume on the upward stroke. This change of position in this particular embodiment occurs automatically under the action of the air coupled with the inertia of the swinging parts. Each wing is preferably provided with an arresting stop 20 that limits its open movement, and these stops will preferably assume such an angular relation to the body of the slats as to arrest the slats at a slight angle of incidence to the vertical, as by so doing the upward component of the oscillatory movement of the wing will develop a forward reaction that is useful in imparting propulsion to the machine. But in addition to propulsive force thus developed, it is to be noted that rotation of the cam shafts 10 will be such that the rearward component of oscillatory movement of the wing is largely coincident with its upward movement, so that a distinct forward propelling effect results from the depending dotted line position of the slats shown in Figure 3 during their rearward upward movement.

Each thrust rod 6 will be attached to its wing 5 or 5ª through some suitable instrumentality, such as the bracket 21, that avoids interference with the pivoted slats 17 and the rod 6. Inasmuch as the oscillatory movement of the wings is with a maintained parallelism of the planes of its consecutive positions, rod 6 must be connected with the bracket 21 through means of a suitable articulation such as suggested at 22.

It is desirable, in controlling the operation of the flying machine, particularly for graduating the lifting effect from climbing to soaring or even controlled descent and incidentally for varying the propelling effect as well, to have means for varying the amplitude of movement imparted to the thrust rod 6 by the engine. While any preferred mechanical means suitable for the purpose may be employed, applicant has selected, in the illustrative embodiment, means whereby the eccentricity of the cam 14 relatively to the shaft 10 may be varied at will, these means consisting in an intermediate cam 23 located within the cam 14 and separated therefrom by an axially adjustable cam shifting sleeve 24, which is keyed to the outer cam 14 through the medium of a spiral groove 25 (see Figure 7) external to the sleeve 24, and keyed to the inner cam 23 through means of a spiral groove 26 internal to the sleeve 24; the arrangement being such that since the inner cam 23 is rigid on the shaft 10, longitudinal movement of sleeve 24 will develop a rotary component due to the pitch of the groove 26, and since outer cam 14 is confined against axial movement by the strap 15, it will receive a rotary component relatively to the inner cam 14 through means of the external spiral groove 25. The combined effect of the two spiral grooves 25 and 26 is sufficient to impart at least 180° relative rotation between the cams 14 and 23, and the result of such relative movement is to change the eccentricity of the outer cam from zero, as when the salient of one cam is adjacent the low point of the other cam, to an eccentricity equal to that of both cams when the salients of the two cams are adjacent; and this shifting of the cams to vary the amplitude of movement transmitted through thrust rod 6 is imparted at the will of the operator through some suitable means within the fuselage, for instance, the bell cranks 27 and 28 acting upon longitudinally adjustable members 29 extending outwardly in the shaft housings 9, which said bell cranks may conveniently be connected through links 30 so that they and their cam shifting members 29 may be simultaneously controlled by handles 31, 32.

As shown in Figure 6, control member 29 is so connected that it can impart sliding movement to the sleeve 24, for instance, through means of slide rod 33 having shifting arm 34 trunnioned at 35 to the wrist bearing 36 of said sleeve 24, this arrangement being preferred in order to accommodate bearings 37 for the shaft 10.

With the arrangement above described or some equivalent arrangement, it is obvious that an operator occupying the position A can, by manipulating the two levers 31, 32, vary the amplitude of movement imparted to the wings 5, 5$^a$, either uniformly as by moving the handles simultaneously apart or together, or increasing the amplitude on one side simultaneously with decreasing it on the other side, as by moving the handles simultaneously in the same direction; and that when the amplitude of movement is thus controlled, climbing, stationary sustention, or controlled descent as well as propelling effects appropriate to each can be determined at the will of the operator, and by differentiating amplitude on opposite sides, the machine may be banked suitably for horizontal steering to either the right or left, and steering action will be facilitated by corresponding differentiation in the propelling effect on the two sides. And these controls in the wing action and forces resulting therefrom are just as fully incident to the machine of the present invention, with its sustaining surfaces subdivided into units which reciprocate or alternate in their vertical movements, as if all of the planes moved simultaneously in the same direction.

It is to be understood that the identifying principles of the invention are capable of being realized by many different constructions, and such changes, so long as they come within the purview of the appended claims, will not involve a departure from the scope of the invention.

As suggested in Figure 8, a wing need not be flat or plane in form; it could without detracting from the operation of its alternating opening and closing surface forming elements be given the conventional parabolic section from front to rear and still leave it composed of its frame 19$^a$ and slats 17$^a$ pivoted at 18$^a$, as already described in connection with Figure 3.

It will also be seen upon reference to Figure 9, that an alternately opening and closing plane can be secured by means other than that shown in Figures 3 and 8, for instance, by having two frames 19$^b$ and 19$^c$ sliding one upon the other, and each constructed with stationary but spaced slats 17$^b$, 17$^{b'}$, which, when the slats of one frame are vertically over those of the other frame, will leave spaces that reduce the air resistance of the wing suitably for its upward stroke. But when, by shifting of the frames, the slats of one frame are brought opposite the spaces of the other frame, a solid surface will be presented suitable for the increased air resistance needed in the downward stroke; and this form of wing lends itself particularly to positive mechanical operation through means of the wing operating thrust rod 6, by merely providing extensions 6$^a$ beyond the articulations 22 and having these extensions 6$^a$ project through the lower frame 19$^b$ into engagement with the upper frame 19$^c$ so that shifting of the frames one upon the other will occur in the desired synchronism with movements imparted to the wing as a whole.

While I have shown the wings located in substantially horizontal planes and having their up and down and fore-and-aft components of their oscillatory movements in fore-and-aft planes that are substantially vertical, it is to be understood that the planes of wing movement may diverge somewhat from the vertical, for instance, in case it be desired to follow the known teachings of the aeroplane art by giving to the wings, on opposite sides of the fuselage, a dihedral set in the relation of one to the other.

I claim:

1. A flying machine comprising an approximately horizontal wing and a plurality of supporting rods for said wing mounted for oscillation in a vertical plane fore and aft of the machine, spaced apart in said plane, hingedly connected with said wing, and while maintaining approximate horizontalism of the wing, imparting movement thereto in a path that is forward and downward and then rearward and upward.

2. A flying machine comprising approximately horizontal wings, a plurality of supporting rods arranged in a vertical fore and aft plane and hingedly connected to said wing, bearings for said rods rocking in said plane and in which said rods are free to slide vertically, and means engaging said rods on the opposite sides of their said bearings from the wing and imparting to said rods simultaneous and symmetrical oscillating movements in said plane.

3. A flying machine as described in claim 1, in which the plane is made up of a plurality of slats arranged transversely of the plane of oscillatory movement of the rods, and pivotally mounted with freedom to change their angles of incidence to the impinging air during the upward and rearward movement of the wing.

4. A flying machine as described in claim 1, in which there are a plurality of wings constructed and mounted as described, and located on opposite sides of the flying machine.

5. A flying machine as described in claim 1, in which there are a plurality of pairs of wing-supporting rods constructed and mounted in the manner described in said claim, with the pairs spaced apart laterally with respect to the plane of oscillation and supporting the wing against tipping sidewise.

Signed at Chicago, Illinois, this 11th day of February, 1929.

JOSEPH DE KORWIN-SOKOLOWSKI.